(12) United States Patent
Hamdi et al.

(10) Patent No.: US 9,665,148 B2
(45) Date of Patent: May 30, 2017

(54) POE POWER DISTRIBUTION SYSTEM FOR POE-POWERED PORT EXTENDER HAVING MULTIPLE DATA AND POWER INPUTS

(71) Applicant: Dell Products L.P., Round Rock, TX (US)

(72) Inventors: Rabah S. Hamdi, Spring, TX (US); Joseph B. Farrell, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 406 days.

(21) Appl. No.: 13/671,135

(22) Filed: Nov. 7, 2012

(65) Prior Publication Data

US 2014/0129855 A1    May 8, 2014

(51) Int. Cl.
  *G06F 1/26* (2006.01)
  *H04L 12/413* (2006.01)

(52) U.S. Cl.
  CPC ............ *G06F 1/266* (2013.01); *H04L 12/413* (2013.01)

(58) Field of Classification Search
  CPC ........ G06F 1/263; G06F 1/266; G06F 1/3203; H04L 12/10
  USPC .......................................................... 713/320
  See application file for complete search history.

(56) References Cited

U.S. PATENT DOCUMENTS

| | | | | |
|---|---|---|---|---|
| 6,449,253 B1* | 9/2002 | Ott | ...................... | H04L 12/5602 370/231 |
| 7,337,336 B2* | 2/2008 | Ferentz et al. | ................ | 713/300 |
| 8,340,111 B1* | 12/2012 | Krivitski et al. | ............. | 370/419 |
| 8,674,546 B1* | 3/2014 | Dix et al. | ......................... | 307/65 |
| 2007/0281755 A1* | 12/2007 | Dwelley | ........................ | 455/572 |
| 2008/0168283 A1* | 7/2008 | Penning | ......................... | 713/310 |
| 2008/0244282 A1* | 10/2008 | Hansalia | ................. | G06F 1/266 713/300 |
| 2009/0228722 A1* | 9/2009 | Lin | ............................... | 713/300 |
| 2010/0049881 A1* | 2/2010 | Manor | .................. | G06F 1/3209 710/18 |
| 2010/0078992 A1* | 4/2010 | Landry | .............. | H03K 17/0822 307/2 |
| 2010/0153750 A1* | 6/2010 | Shah | ................. | H04L 12/40045 713/300 |
| 2012/0246458 A1* | 9/2012 | Jain et al. | ...................... | 713/100 |
| 2013/0013936 A1* | 1/2013 | Lin et al. | ...................... | 713/300 |
| 2013/0033978 A1* | 2/2013 | Eckert | ..................... | H04L 45/16 370/216 |

(Continued)

*Primary Examiner* — Kim Huynh
*Assistant Examiner* — Danny Chan
(74) *Attorney, Agent, or Firm* — Haynes and Boone, LLP

(57) ABSTRACT

A port extender includes a chassis with uplink ports that are operable to receive power and data from a power sourcing device, and user device ports that are operable to connect to user devices. A power management processor is coupled to each of the uplink ports and the user device ports. The power management processor is operable to determine a power budget using power received by the uplink ports. The power management processor is also operable to detect a port configuration event such as the removal of a connection of a user device to a user device port, the inactivity of a user device port, or the addition of a connection of a user device to a user device port, and in response, selectively provide power to one or more of the plurality of user device ports based on the power budget and the port configuration event.

20 Claims, 6 Drawing Sheets

(56) References Cited

U.S. PATENT DOCUMENTS

2013/0339760 A1* 12/2013 Zimmerman ............. G06F 1/26
713/300

* cited by examiner

POE POWER DISTRIBUTION SYSTEM FOR POE-POWERED PORT EXTENDER HAVING MULTIPLE DATA AND POWER INPUTS

BACKGROUND

The present disclosure relates generally to information handling systems, and more particularly to an adaptive, power-injected port extender for coupling a plurality of information handling systems to a network.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are typically coupled to networking devices such as, for example, port extenders, that provide multiple connections to the network. Port extenders typically couple to network controllers and/or other networking devices and provide a plurality of ports with which to couple IHSs to the network controller. However, the use of port extenders can raise issues when power sources are not plentiful, e.g., when the IHSs coupled to the port extender require the available power sources (e.g., power outlets) such that there is no power source for the port extender, when there are no readily available power sources for the port extender or IHSs, and/or in a variety of other limited power source situations known in the art. In general, the use of port extenders in high density IHS configurations and remote locations can cause issues with respect to the lack of available power sources for the port extender and/or the IHSs, and high costs can be associated with the cabling of the port extender or IHSs to a power source.

Accordingly, it would be desirable to provide an improved port extender.

SUMMARY

According to one embodiment, a port extender includes a chassis; a plurality of first networking ports that are located on the chassis and that are each operable to receive power and data from a power sourcing device; a plurality of second networking ports that are located on the chassis and that are each operable to connect to an information handling system (IHS); and a power management processor that is coupled to each of the plurality of first networking ports and the plurality of second networking ports, wherein the power management processor is operable to: determine a power budget using power received by one or more of the plurality of first networking ports; and selectively provide power to one or more of the plurality of second networking ports based on the power budget.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
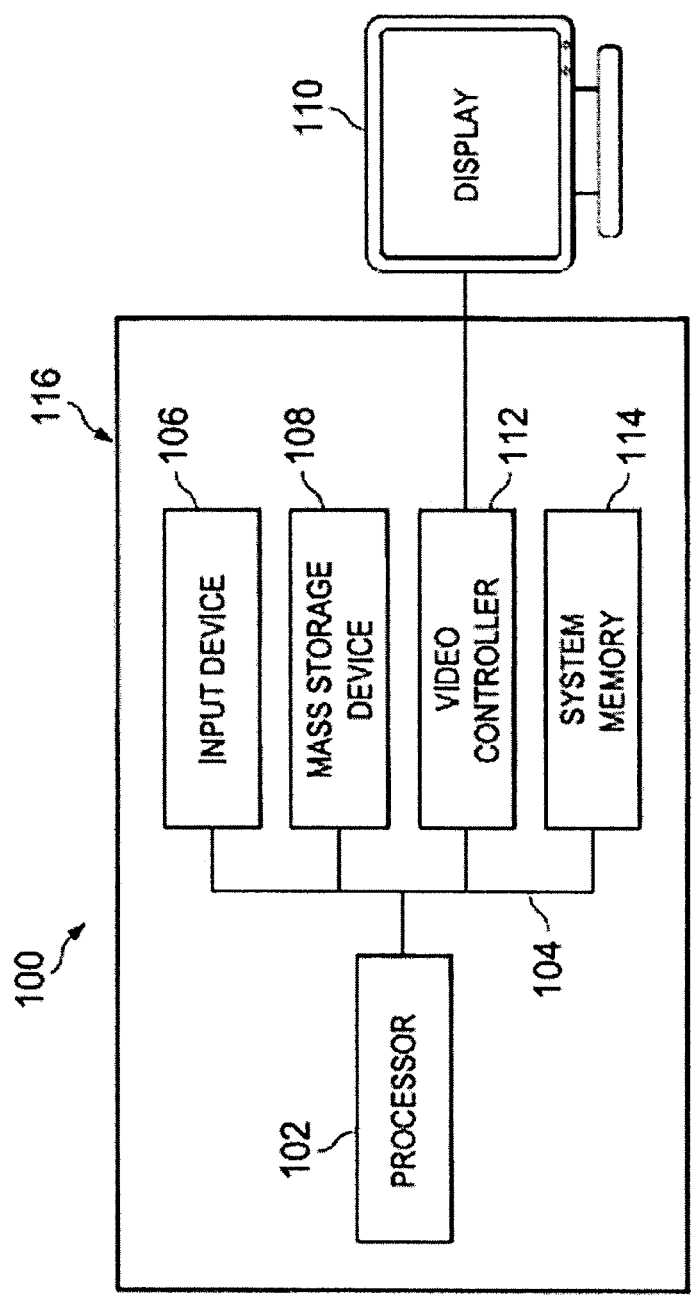
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
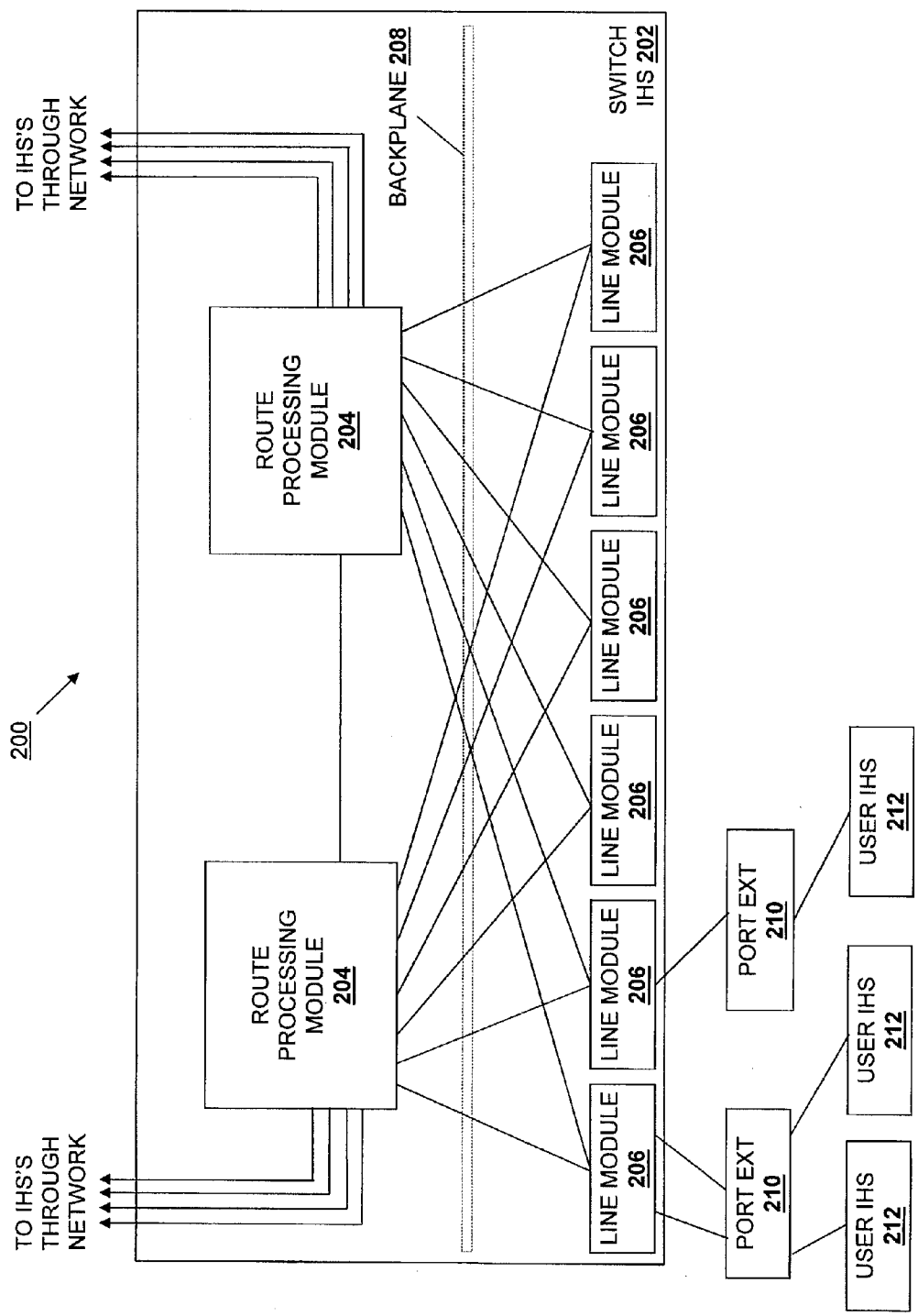
FIG. 2 is a schematic view illustrating an embodiment of a networked system.

Referring now to FIG. 2, an embodiment of a portion of a networked system 200 is illustrated. The embodiment of the networked system 200 illustrated in FIG. 2 is an example of a switching system including the adaptive power-injected port extender of the present disclosure. However, the example illustrated in FIG. 2 is simply one example of a networked system that may provide network switching according to the teachings of the present disclosure, and one of skill in the art will recognize that the teachings below may be applied to a variety of different devices and systems without departing from the scope of the present disclosure. The networked system 200 includes a switch IHS 202, network controller, or other networking device having a plurality of route processing modules 204 each connected to a plurality of line modules 206 through a backplane 208. In an embodiment, the route processing modules 204 may include centralized switching Applications Specific Integrated Circuits (ASICs). As illustrated for one of the line modules 206, any of the line modules 206 may be connected to one or more port extenders 210. As illustrated for some of the port extenders 210, any of the port extenders 210 may be coupled to one or more user IHS's 212, user devices, and/or other network devices known in the art. As would be understood by one of skill in the art, the switch IHS 202 may be connected to a core switch or router (not illustrated) that is further connected the Internet, a datacenter, etc.

Figure 3:
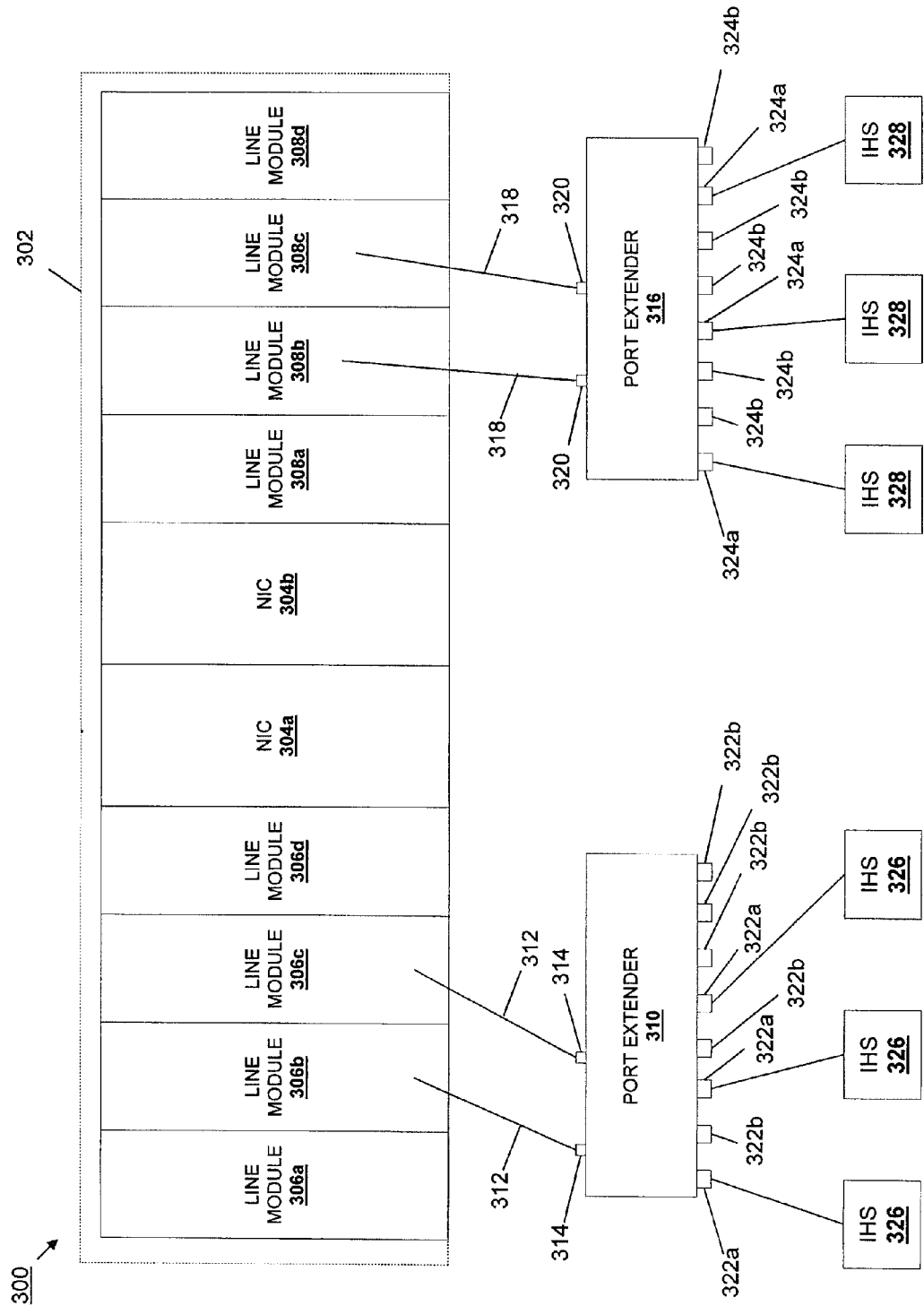
FIG. 3 is a schematic view illustrating an embodiment of a networked system.

Referring now to FIG. 3, an embodiment of a networked system 300 is provided that includes many of the same features at the networked system 200, but illustrates an embodiment of specific details of some of the components. A power sourcing device 302 includes a plurality of network controllers (NCs) 304a and 304b, along with a plurality of line modules 306a, 306b, 306c, 306d, 308a, 308b, 308c, and 308d. In an embodiment, the power sourcing device 302 may be a variety of power sourcing equipment (PSE) known in the art. In an embodiment, the line modules 306a-d and 308a-d are Power over Ethernet (PoE) PSE line modules that are configured to transmit electrical power along with data safely over Ethernet cabling. For example, any of the line modules 306a-d and 308a-d may be 10G PoE+ line modules, 1G PoE+ line modules, and/or a variety of other PoE PSE line modules known in the art. One of skill in the art will recognize PoE+ as a Power over Ethernet standard that is operable to provide up to 25.5 watts of power, although other existing or future PoE standards providing more or less power are envisioned as falling within the scope of the present disclosure.

A port extender 310 is coupled to the power sourcing device 302 through the connection of cables 312 between a plurality of first networking/uplink ports 314 (referred to hereinafter as "uplink ports", although other ports are envisioned as falling within the scope of the present disclosure) and PoE ports on the line modules 306b and 306c. A port extender 316 is coupled to the power sourcing device 302 through the connection of cables 318 between a plurality of first networking/uplink ports 320 (referred to hereinafter as "uplink ports", although other ports are envisioned as falling within the scope of the present disclosure) and PoE ports on the line modules 308b and 308c. In an embodiment the cables 312 and 318 are configured to safely transmit electrical power along with data. The port extender 310 includes a plurality of second networking/user device ports 322 (including activated ports 322a and deactivated/low power mode ports 322b, discussed in further detail below) and the port extender 316 includes a plurality of second networking/user device ports 324 (including activated ports 324a and deactivated/low power mode ports 324b). The second networking/user device ports 322 and 324 are both referred to hereinafter as "user device ports", although other ports are envisioned as falling within the scope of the present disclosure. As discussed below, the user device ports 322 and 324 may be activated, deactivated, put into a low power mode, and/or otherwise reconfigured from their standard operations by the port extenders 310 and 316, respectively, based on port profiles, port classifications, port priorities, and/or port configuration events such as, for example the connection, disconnection, or inactivity of network devices using the user device ports. As such, in the embodiment illustrated in FIG. 3, the activated user device ports 322a on the port extender 310 are each coupled to a respective IHS 326 while the deactivated/low power mode user device ports 322b are not connected to any devices or connected to inactive devices, and the activated user device ports 324a on the port extender 316 are each coupled to a respective IHS 328 while the deactivated/low power mode user device ports 324b are not connected to any devices or connected to inactive devices.

Figure 4:
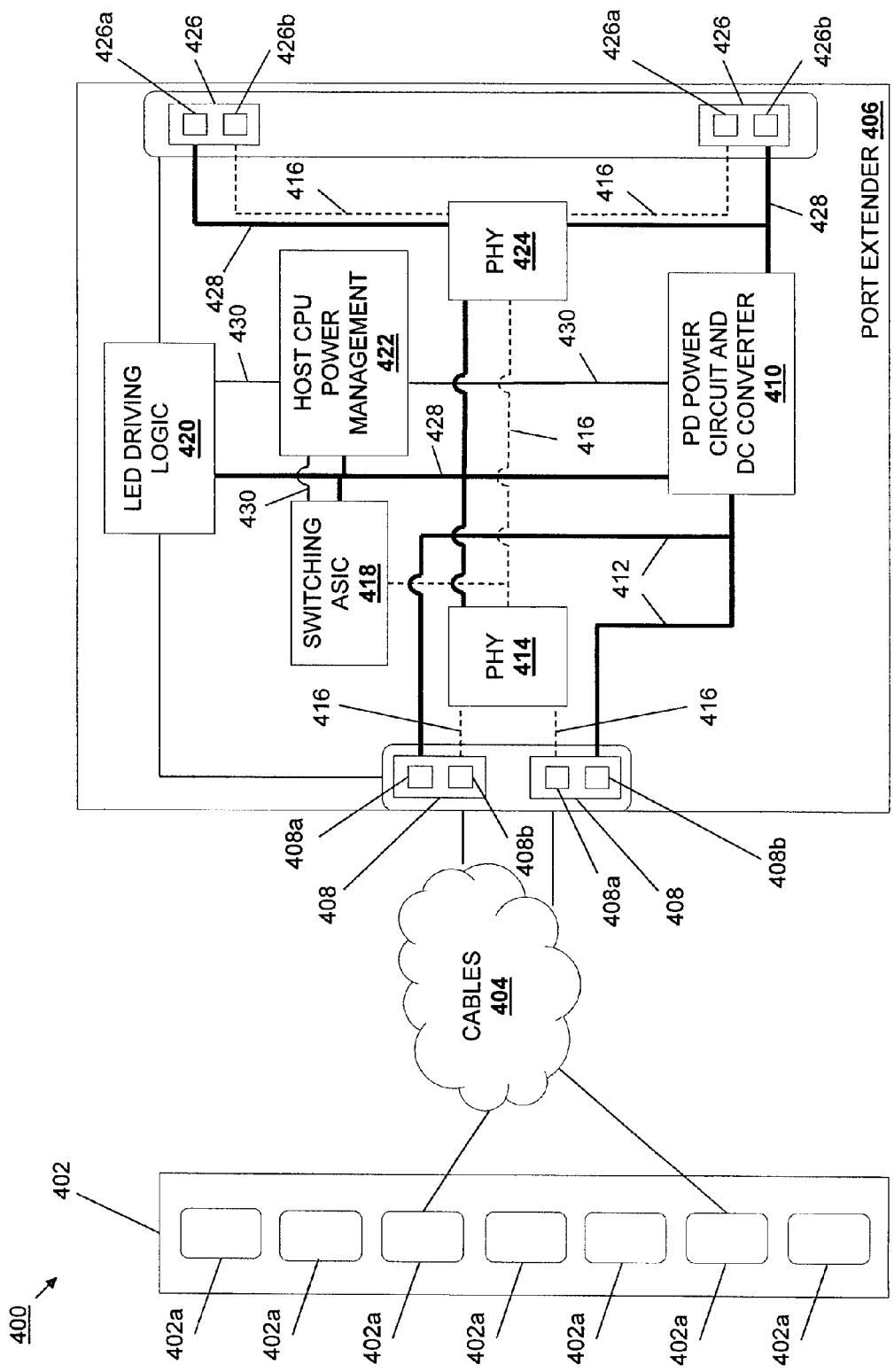
FIG. 4 is a schematic view illustrating an embodiment of a networked system.

Referring now to FIG. 4, an embodiment of a networked system 400 is provided that includes many of the same features as the networked systems 200 and 300, but illustrates an embodiment of specific details of some of the components. In the networked system 400, a line module 402 includes a plurality of ports 402a. In an embodiment, some or all of the ports 402a are PSE ports that are configured to transmit electrical power along with data safely over Ethernet cabling. One or more cables 404 couple the line module 402 to a port extender 406 by coupling to the ports 402a on the line module 402 and to uplink ports 408 on the port extender 406. In an embodiment, the one or more cables 404 are PoE cables that are configured to safely transmit electrical power along with data. Each of the uplink ports 408 is coupled to a power indicator 408a and a data indicator 408b that, in an embodiment, may be light emitting devices (LEDs) and/or other indicators known in the art.

The port extender 406 includes a Powered Device (PD) power circuit and Direct Current (DC) converter 410 that is coupled to the uplink ports 408 to receive input power 412 (indicated by the bolded lines in FIG. 4). In an embodiment, the PD power circuit and DC converter 410 is operable to detect and receive power from the uplink ports 408 and convert the power such that a DC power that is of an appropriate power level for use by any of the components in the port extender 406 is provided. A physical layer (PHY) 414 is coupled to the uplink ports 408 to receive data signals 416 (indicated by the dashed lines in FIG. 4). The port extender 406 also includes a switching Application Specific Integrated Circuit (ASIC) 418, LED (or other indicator) driving logic 420, a power management processor 422, a PHY 424, and a plurality of user ports 426 (each including power indicators 426a and data indicators 426b similar to the indicators 408a and 408b on the uplink ports 408 discussed above), coupled together as discussed below.

The PD power circuit and DC converter 410 is coupled to each of the switching ASIC 418, the LED driving logic 420, the power management processor 422, the PHY 414, the PHY 424, and one of the user device ports 426 to output power 428 (indicated by the bolded lines in FIG. 4) received from the uplink ports 408 to those components, with the PHY 424 transmitting output power 428 received from the PD power circuit and DC converter 410 to the other user device port 426. The PHY 414 is coupled to the switching ASIC 418 and the PHY 424 to transmit the data signals 416 received from the uplink ports 408 to those components, with the PHY 424 transmitting the data signals 416 to each of the user device ports 426. The power management processor 422 is coupled to each of the PD power circuit and DC converter 410, the switching ASIC 418, and the LED driving logic to exchange control and information signals 430 (indicated by the normal lines in FIG. 4) with those components. The LED (or other indicator) driving logic 420 is coupled to each of the uplink ports 408 and the user device ports 426 to provide control signals to those components (e.g., the indicators 408a, 408b, 426a, and 426b). While a specific example of a port extender with components coupled together in a particular manner has been provided, one of skill in the art will recognize that a variety of other connections between the components may exist that are not illustrated for clarity of discussion, and that a port extender may be provided with different components and/or different architectures while remaining within the scope of the present disclosure.

Figure 5:
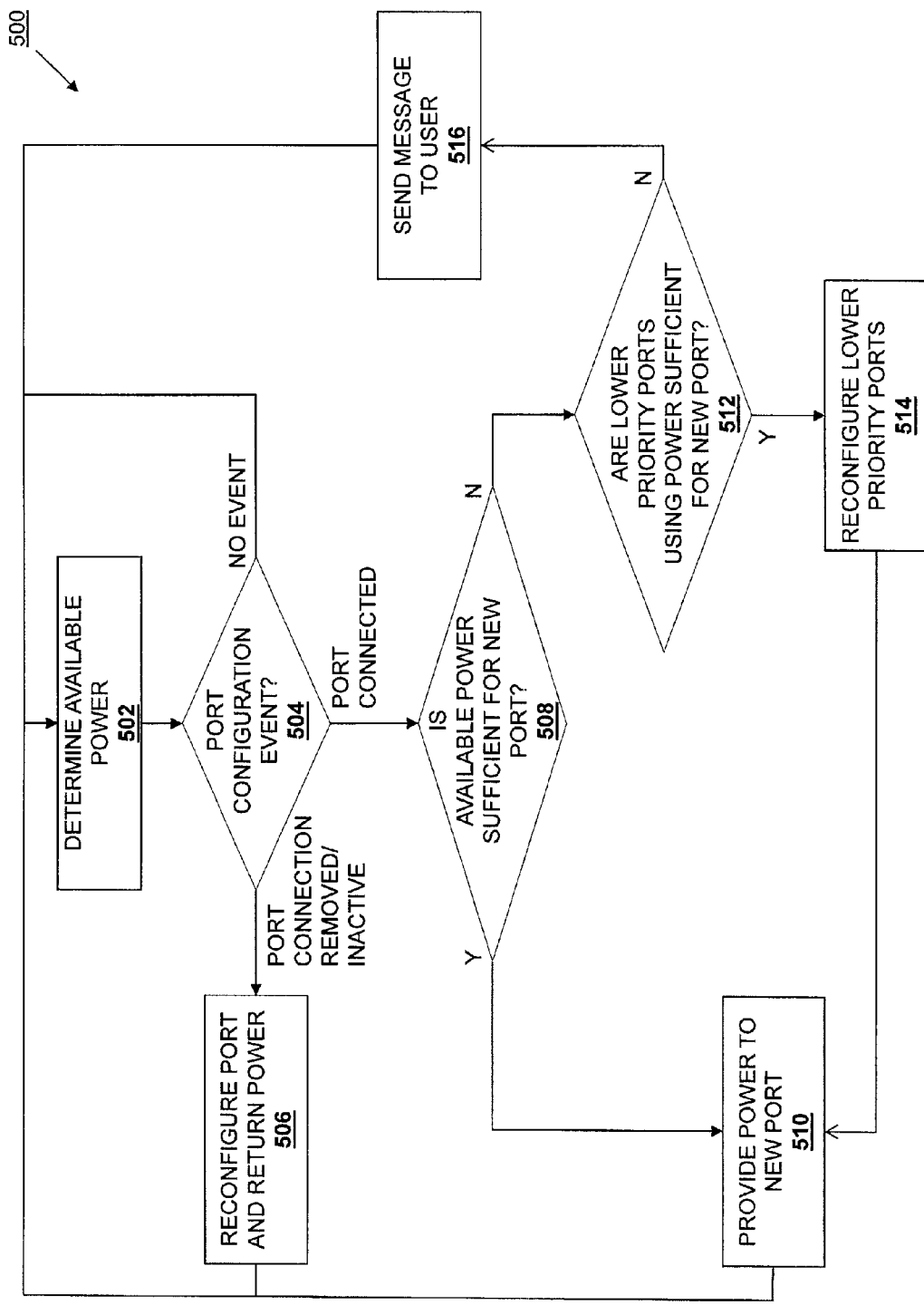
FIG. 5 is a flow chart illustrating an embodiment of a method for powering a port extender.

Referring now to FIGS. 3, 4, and 5, a method 500 for powering a port extender is illustrated. The method 500, along with its associated systems, provides a port extender that is power injected via Ethernet uplink ports using PoE standards. The port extender monitors the available power budget received via the uplink ports and intelligently distributes power or otherwise provides appropriate levels of power to user device ports or other downstream ports based on port profiles, port priorities, and port classifications that may be set by a network administrator or other user of the system. As discussed below, based on the power received through the uplink ports, the port extender will compute the number of ports that can be sufficiently powered (e.g., using the profiles, priorities, and classifications discussed above) such that those ports may be activated to provide data and, in some embodiments, power to their connected network devices. When the available power or power budget is not sufficient for the port extender to activate all the user device ports, higher priority ports may be activated while lower priority ports may be deactivated. The port extender may then continue to monitor the user device ports and determine the power budget available via the power received through the uplink ports to reallocate power to user device ports as power becomes available or as port status, port priority, or other port characteristics change. For example, the port extender may monitor user device ports for activity and if a user device port becomes disconnected or inactive for a predetermined time, the port extender may deactivate the port or put the port in a low power mode to preserve the available power or power budget for other user device ports and/or to provide power returned to the power budget to previously deactivated ports. The port extender may then continually check for connected, disconnected, active, and inactive ports and adjust the power provided to the ports accordingly. Furthermore, the port extender may generate events and alarms that may be triggered and sent to the network administrator or user of the system in response to, for example, loss of source power on the uplink ports, insufficient power available to activate user device ports, user port log events, and/or a variety of other event/alarm triggers known in the art.

The method 500 begins at block 502 where available power (a "power budget") is determined. Prior to beginning the method 500, the port extender may be coupled to a networked system such as, for example, the port extenders 210 coupled to the line modules 206 and the user IHSs 212 as described above with reference to FIG. 2, the port extender 310 coupled to the line modules 306b and 306c via its uplink ports 314 and to the IHSs 326 via its user device ports 322a, and the port extender 316 coupled to the line modules 308b and 308c via its uplink ports 320 and to the IHSs 328 via its user device ports 324a as described above with reference to FIG. 3, and the port extender coupled to the ports 402a on the line module 402 via its uplink ports 408 and to user devices (not illustrated) via its user device ports 426 as described above with reference to FIG. 4. In an embodiment, the port extender of the present disclosure may only receive power through its uplink ports. However, in other embodiments, the port extender of the present disclosure may be operable to couple to a power source (e.g., an AC power outlet) in addition to receiving power through the uplink ports.

As discussed above, power is provided from the line modules to the port extender via the connection through the uplink ports. With reference to FIG. 4, that input power 412 is transmitted through the uplink ports 408 to the PD power circuit and DC converter 410. The power management processor 422 is operable to determine the amount of power received at the PD power circuit and DC converter 410. Furthermore, the power management processor 422 may be coupled to a memory or other storage (not illustrated, but similar to the system memory 114 and/or storage 108 discussed above with reference to FIG. 1) that may include a database or other data storage structure that includes port profiles, port priorities, port classifications, and/or a variety of other port information that may be provided by a network administrator or other user of the system. In an embodiment, port profiles may include any port properties and configurations set by a network administrator. In an embodiment, port priorities may include mandatory port designations, high priority port designations, low priority port designations, and/or a variety of other port priorities known in the art. In an embodiment, port classifications may include some or all of the allowed PoE classification types known in the art. Using the port information and the amount of power received through the uplink ports 408, the power management processor 422 computes, calculates, and/or otherwise determines a power budget that includes the amount of available power for the components of the port extender 406.

The method 500 then proceeds to decision block 504 where it is determined whether a port configuration event has occurred. In an embodiment, a port configuration event may include adding a connection to a port, removing a connection from a port, the inactivity of a port for a predetermined amount of time, a port failure, reclassification of an IHS connected to a port, power consumption measurement exchanges for power allocation negotiations between the port extender and an IHS connected to the port extender, and/or a variety of other port configuration events known in the art. In an embodiment, the power management processor 422 is coupled to each of the user device ports 426 and monitors those user device ports continuously or periodically to determine whether a port configuration event has occurred. If, at decision block 504, it is determined that no port configuration event has occurred, the method returns to block 502 where the available power or power budget is determined. For example, the power management processor 422 is coupled to the uplink ports 408 and the power received through those uplink ports 408 may change. Thus, even when a port configuration event has not occurred at decision block 504, the available power or power budget may be redetermined or recomputed to account for variable power being received at the uplink ports 408.

If, at decision block 504, it is determined that a port configuration event has occurred that includes a port connection having been removed or having become inactive, (, the method 500 proceeds to block 506 where the port is reconfigured by, for example, deactivating the port or putting the port in a low power mode such that some or all (e.g., a majority) of the power being provided to that port is returned to the power budget. For example, at decision block 504, a cable connecting a user device to a user device port 426 (e.g., the cable connecting a user IHS 212 to a port extender 210 in FIG. 2, the cable connecting an IHS 326 to one of the user device ports 322a on the port extender 310 or the cable connecting an IHS 328 to a user device port 324a on the port extender 316 in FIG. 3) is disconnected from that user device port 426, and the power management processor 422 detects that disconnection from user device port 426, determines a port configuration event has occurred, and the method 500 proceeds to block 506. In another example, at decision block 504, the power management processor 422 determines that a user device port 426 has been inactive for a predetermined amount of time by, for example, determining that a port profile for that user device port 426 specifies that the port should only be provided power (or power sufficient to fully activate that user device port 426) if that port is not inactive for the predetermined amount of time, and in response, the method 500 proceeds to block 506.

At block 506, the power management processor 422 reconfigures the disconnected or inactive user device port 426 by, for example, turning the user device port 426 off, disabling the user device port 426, putting the user device port 426 in a low power mode, and/or otherwise reducing the power consumed by the user device port 426 that was disconnected from a network device or determined to be inactive for the predetermined amount of time. The reconfiguration of the user device port 426 may be determined using the port profile associated with that user device port 426. For example, for a disconnected port, the port profile may indicate that the port should be disabled or put in a low power mode, while for an inactive port, the port profile may indicate that the port should be put in a low power mode (e.g., so that it may be detected when the port/user device connected to the port becomes active.) In response to reducing the power consumed by the user device port 426 at block 506, some or all of that power is "returned" to the power budget that includes the power received from the uplink ports 408. The method 500 then returns to block 502 where the available power or power budget is determined or recomputed.

If, at decision block 504, it is determined that a port configuration event has occurred that includes a port being connected to a user device, the method 500 proceeds to decision block 508 where it is determined whether the available power or power budget is sufficient for the newly connected port. For example, at decision block 504, a cable may be used to connect a user device to a user device port 426 (e.g., the cable connecting a user IHS 212 to a port extender 210 in FIG. 2, the cable connecting an IHS 328 to one of the user device ports 322a on the port extender 310 or the cable connecting an IHS 328 to a user device port 324a on the port extender 316), and the power management processor 422 detects that connection to the user device port 426, determines a port configuration event has occurred, and the method 500 proceeds to decision block 508.

At decision block 508, the power management processor 422 determines whether the available power or power budget includes sufficient power for the user device port 426 to which the connection was made at decision block 504. For example, the power management processor 422 may compare the available power or power budget determined in block 502 to an expected power consumption of the user device port 426 to which the connection was made (e.g., as provided in a port profile, port classification, or other port information available to the power management processor 422, to a power draw from the user device port 426 to which the connection was made, and/or using a variety of other power consumption determination methods know in the art.) If, at decision block 508, it is determined that the available power or power budget includes sufficient power for the user device port 426 to which the connection was made, the method 500 proceeds to block 510 where power is provided to the new port. In an embodiment, the power management processor 422 is operable to provide power to the user device port 426 to which the connection was made by, for example, providing a control signal 430 to the PD power circuit and DC converter 410 to provide power to the user device port 426. In an embodiment, the power provided to the new port at block 510 may be sufficient to allow the port to transmit data and/or power sufficient to power its connected user device. The method 500 then returns to block 502 where the available power or power budget is determined or recalculated (e.g., to figure in the power now being provided to the user device port 426 to which the connection was made at decision block 504.)

If, at decision block 508, it is determined that the available power or power budget does not include sufficient power for the user device port 426 to which the connection was made at decision block 504, the method 500 proceeds to decision block 512 where it is determined whether there are lower priority ports receiving power from the available power or power budget that is sufficient to power the new port. As discussed above, user device ports 426 may have port priorities associated with them (e.g., in a memory coupled to the power management processor 422), and thus, the plurality of user device ports 426 on the port extender 406 may be prioritized relative to each other. At decision block 512, the power management processor 422 reviews the port priorities of each of the user device ports 426 that are receiving power from the available power or power budget and determines whether the user device port 426 to which the connection was made at decision block 504 has a higher priority than any of the user device ports 426 that are receiving power from the available power or power budget. In an embodiment, power being supplied to the lower priority ports that is sufficient to power the new port may include power sufficient to allow the new port to transmit data and/or power sufficient to power the new ports connected user device.

If at decision block 512, it is determined that there are lower priority ports receiving power from the available power or power budget that is sufficient to power the new port, the method 500 proceeds to block 514 where one or more lower priority ports are reconfigured. For example, the power management processor 422 may determine the amount of power necessary to sufficiently power the user device port 426 to which the connection was made at decision block 504, and then determine a subset of lower priority user device ports (which may include all of the user device ports with a lower priority than the user device port 426 to which the connection was made at decision block 504) that are using an amount of power necessary to sufficiently power the user device port 426 to which the connection was made at decision block 504, and then deactivate, put in a low power mode, or otherwise reconfigure that subset of user device ports from their standard operation at block 514. The method 500 will then proceed to block 510 where power will be provided to the user device port 426 to which the connection was made at decision block 504, as discussed above.

If, at decision block 512, it is determined that there are no lower priority user device ports, the method 500 then proceeds to block 516 where a message is sent to the user. In an embodiment, the message may include that there is insufficient power to power the user device port 426 to which the connection was made. For example, the power management processor 422 may determine that the available power or power budget is insufficient to power the user device port 426 to which the connection was detected in decision block 504, and there are no lower priority ports receiving power from the available power or power budget and, in response, send a message to a user for display on a display device that indicates to the user that the user device port 426 to which the connection was made will not receive power unless the priorities of the user device ports 426 are reconfigured or other connections of user devices to the user device ports 426 are removed. The method 500 then returns to block 502 to determine the available power or power budget substantially as discussed above.

Figure 6:
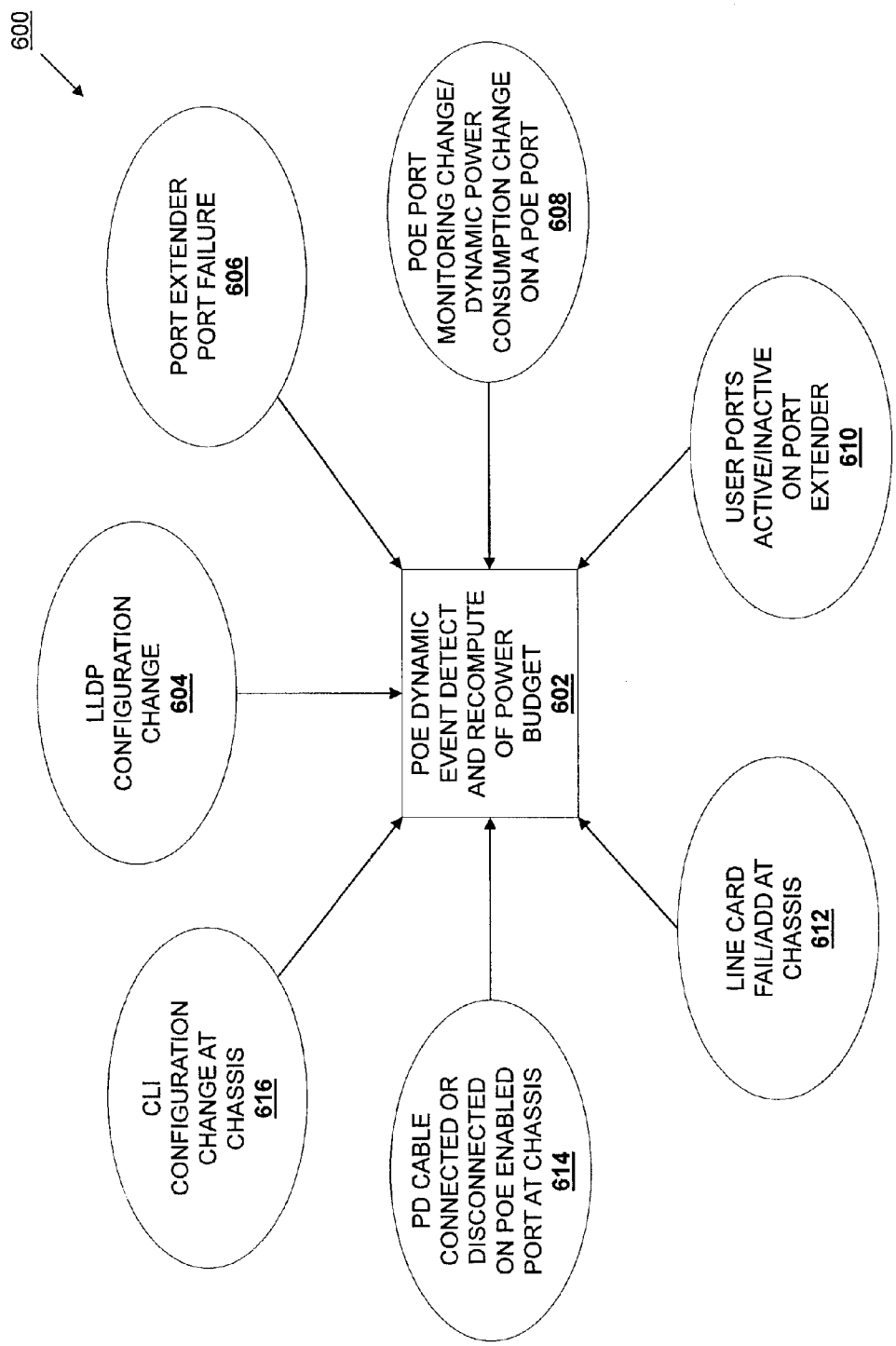
FIG. 6 is a flow chart illustrating a mapping of the monitoring and tracking of a plurality of events in a port extender.

Referring now to FIG. 6, an embodiment of a mapping 600 of the monitoring of ports in a port extender is illustrated that provides an example of events that may be monitored and tracked by the power management processor and which may result in the detection of port configuration events and/or the determination, recomputing, or recalculation of the available power or power budget at block 602. As illustrated, such events include a Link Layer Discovery Protocol (LLDP) configuration change 604, a port extender port failure 606, a port monitoring change or dynamic power consumption change on a port 608, a user port being active or inactive 610, a line card fail or add 612, a cable connect/disconnect on a PoE enabled port 614, and/or a Common Language Infrastructure (CLI) configuration change 616. While a few examples have been provided, one of skill in the art will recognize that a variety of other events may be monitored and tracked for use in determining, recomputing, and/or recalculating the available power or power budget for the port extender described herein while remaining within the scope of the present disclosure.

Thus, a system and method have been described that provides a port extender that receivers power and data over the same coupling or couplings and intelligently distributes that power to ports on the port extender based on the available power/power budget, port profiles, port classifications, and/or port priorities. Such system and methods provide for an optimized, low cost networking device that extends the reach of infrastructure deployment in remote areas where power may not be available. One of skill in the art will recognize that the port extender of the present disclosure may act as Power Source Equipment that provides power received through the uplink ports through the user device ports for powering network devices coupled to those user device ports.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A port extender, comprising:
a chassis;
a plurality of first networking ports that are located on the chassis and that each receive power and data through a networking cable from a power sourcing device;
a plurality of second networking ports that are located on the chassis and that each connect to an information handling system (IHS) and provide power and data through a networking cable to that IHS;
a port information database storing a port profile for at least one of the plurality of second networking ports that specifies the reallocation of power that is being provided to the at least one of the plurality of second networking ports if the at least one of the plurality of second networking ports is inactive for a predetermined amount of time; and
a power management processor that is located in the chassis and coupled to each of the plurality of first networking ports, the plurality of second networking ports, and the port information database, wherein the power management processor:
determines a power budget using power received through the plurality of first networking ports;
selectively provides the power that is received through the plurality of first networking ports to one or more of the plurality of second networking ports based on the power budget;
reallocates a first portion of the power from being provided to a first of the at least one of the plurality of second networking ports according to the port profile and in response to determining that the first of the at least one of the plurality of second networking ports has been inactive for the predetermined amount of time; and
continues to provide a second portion of the power to the first of the at least one of the plurality of second networking ports, wherein the continued provision of the second portion of the power to the first of the at least one of the plurality of second networking ports allows for the detection of the first of the at least one of the plurality of second networking ports becoming active after having been inactive for the predetermined amount of time.

2. The port extender of claim 1, wherein the power management processor:
detects a port configuration event, wherein the selectively providing the power that is received through the plurality of first networking ports to the one or more of the plurality of second networking ports is based on the power budget and the port configuration event.

3. The port extender of claim 2, wherein the port configuration event includes the removal of a connection of an IHS to a first of the plurality of second networking ports, and wherein the selectively providing the power that is received through the plurality of first networking ports to the one or more of the plurality of second networking ports includes reducing the power consumption of the first of the plurality of second networking ports.

4. The port extender of claim 1, wherein the port information database stores Power over Ethernet (PoE) classifications for each of the plurality of second networking ports, and wherein the power management processor:
determines the power budget using power received through the plurality of first networking ports and the PoE classifications for each of the plurality of second networking ports.

5. The port extender of claim 2, wherein the port configuration event includes the adding of a connection of an IHS to a first of the plurality of second networking ports, and wherein the power management processor:
   determines that the power budget is sufficient to power the first of the plurality of second networking ports and, in response, selectively provides power to the first of the plurality of second networking ports.

6. The port extender of claim 2, wherein the port configuration event includes the adding of a connection of an IHS to a first of the plurality of second networking ports, and wherein the power management processor:
   determines that the power budget is insufficient to power the first of the plurality of second networking ports and, in response, determines whether there are lower priority second networking ports being powered using the power budget.

7. The port extender of claim 6, wherein the power management processor:
   reduces a power consumption of the lower priority second networking ports in response to determining there are lower priority second networking ports being powered using the power budget; and
   powers the first of the plurality of second networking ports in response to the reducing of the power consumption of the lower priority second networking ports resulting in the power budget being sufficient to power the first of the plurality of second networking ports.

8. An networking information handling system comprising:
   a plurality of uplink ports that receive power and data through a networking cable;
   a plurality of user device ports that connect to a user device and provide power and data through a networking cable to the user device;
   a port information database storing a port profile for at least one of the plurality of user device ports that specifies the reallocation of power that is being provided to the at least one of the plurality of user device ports if the at least one of the plurality of user device ports is inactive for a predetermined amount of time;
   one or more processors that are coupled to the plurality of uplink ports, the plurality of user device ports, and the port information database; and
   a memory coupled to the one or more processors and including instructions that, when executed by the one or more processors, cause the one or more processors to:
      determine a power budget based on power received through the plurality of uplink ports;
      detect at least one port configuration event;
      selectively provide the power that is received through the plurality of uplink ports to one or more of the plurality of user device ports based on the power budget and the at least one port configuration event;
      reallocate a first portion of the power from being provided to a first of the at least one of the plurality of user device ports according to the port profile and in response to determining that the first of the at least one of the plurality of user device ports has been inactive for the predetermined amount of time;
      continue to provide a second portion of the power to the first of the at least one of the plurality of user device ports; and
      detecting, at least in part based on the continued provision of the second portion of the power to the first of the at least one of the plurality of user device ports, the first of the at least one of the plurality of second networking ports becoming active after having been inactive for the predetermined amount of time.

9. The IHS of claim 8, wherein at least one port configuration event includes the removal of a connection of an user device to a first of the plurality of user device ports, and wherein the selectively providing the power that is received through the plurality of uplink ports to the one or more of the plurality of user device ports includes reducing the power consumption of the first of the plurality of user device ports.

10. The IHS of claim 8, wherein the port information database stores Power over Ethernet (PoE) classifications for each of the plurality of user device ports, and wherein the memory includes instructions that, when executed by the one or more processors, cause the one or more processors to:
   determine the power budget using power received through the plurality of uplink ports and the PoE classifications for each of the plurality of user device ports.

11. The IHS of claim 8, wherein at least one port configuration event includes the adding of a connection of a user device to a first of the plurality of user device ports, and wherein the memory includes instructions that, when executed by the one or more processors, cause the one or more processors to:
   determine that the power budget is sufficient to power the first of the plurality of user device ports and, in response, selectively provide power to the first of the plurality of user device ports.

12. The IHS of claim 8, wherein at least one port configuration event includes the adding of a connection of a user device to a first of the plurality of user device ports, and wherein the memory includes instructions that, when executed by the one or more processors, cause the one or more processors to:
   determine that the power budget is insufficient to power the first of the plurality of user device ports and, in response, determine whether there are lower priority user device ports being powered using the power budget.

13. The IHS of claim 12, wherein the memory includes instructions that, when executed by the one or more processors, cause the one or more processors to:
   reduce a power consumption of the lower priority user device ports in response to determining there are lower priority user device ports being powered using the power budget; and
   power the first of the plurality of user device ports in response to the reducing of the power consumption of the lower priority user device ports resulting in the power budget being sufficient to power the first of the plurality of second networking ports.

14. The IHS of claim 8, wherein the memory includes instructions that, when executed by the one or more processors, cause the one or more processors to:
   recalculate the power budget in response to detecting the at least one port configuration event and selectively providing the power that is received through the plurality of uplink ports to one or more of the plurality of user device ports based partly on the at least one port configuration event.

15. A method for powering a port extender, comprising:
   providing receiving power and data through a plurality of uplink ports on a port extender;
   determining, by a power management processor included in the port extender, a power budget using the power received at the plurality of uplink ports;

detecting, by the power management processor, at least one port configuration event involving one or more of a plurality user device ports on the port extender;

selectively providing, by the power management processor, power that is received through the plurality of uplink ports to one or more of the plurality of user device ports based on the power budget and the at least one port configuration event;

reallocating, by the power management processor according to a port profile that is stored in a port information database, a first portion of the power that is being provided to a first of the at least one of the plurality of user device ports in response to determining that the first of the at least one of the plurality of user device ports has been inactive for a predetermined amount of time; and continuing, by the power management processor according to the port profile that is stored in a port information database, to provide a second portion of the power to the first of the at least one of the plurality of user device ports, wherein the continued provision of the second portion of the power to the first of the at least one of the plurality of user device ports allows for the detection of the first of the at least one of the plurality of second networking ports becoming active after having been inactive for the predetermined amount of time.

16. The method of claim 15, wherein at least one port configuration event includes the removal of a connection of an user device to a first of the plurality of user device ports, and wherein the selectively providing the power that is received through the plurality of uplink ports to the one or more of the plurality of user device ports includes reducing the power consumption of the first of the plurality of user device ports.

17. The method of claim 15, wherein the method further comprises:

determining, by the power management processor, the power budget using power received through the plurality of uplink ports and Power over Ethernet (PoE) classifications that are stored in the port information database for each of the plurality of user device ports.

18. The method of claim 15, wherein at least one port configuration event includes the adding of a connection of a user device to a first of the plurality of user device ports, and wherein the method further comprises:

determining, by the power management processor, that the power budget is sufficient to power the first of the plurality of user device ports and, in response, selectively provide power to the first of the plurality of user device ports.

19. The method of claim 15, wherein at least one port configuration event includes the adding of a connection of a user device to a first of the plurality of user device ports, and wherein the method further comprises:

determining, by the power management processor, that the power budget is insufficient to power the first of the plurality of user device ports and, in response, determine whether there are lower priority user device ports being powered using the power budget.

20. The method of claim 19, further comprising:

reducing, by the power management processor, a power consumption of the lower priority user device ports in response to determining there are lower priority user device ports being powered using the power budget; and powering, by the power management processor, the first of the plurality of user device ports in response to the reducing of the power consumption of the lower priority user device ports resulting in the power budget being sufficient to power the first of the plurality of second networking ports.

* * * * *